United States Patent
Ehrett et al.

(10) Patent No.: US 12,461,872 B2
(45) Date of Patent: Nov. 4, 2025

(54) SEMICONDUCTOR DEVICE FOR PERFORMING DATA REDUCTION FOR PROCESSING ARRAYS

(71) Applicant: Advanced Micro Devices, Inc., Santa Clara, CA (US)

(72) Inventors: William Peter Ehrett, Austin, TX (US); Anthony Gutierrez, Bellevue, WA (US); Vedula Venkata Srikant Bharadwaj, Bellevue, WA (US); Karthik Ramu Sangaiah, Bellevue, WA (US); Prachi Shukla, Santa Clara, CA (US); Sriseshan Srikanth, Austin, TX (US); Ganesh Dasika, Austin, TX (US); John Kalamatianos, Boxborough, MA (US)

(73) Assignee: Advanced Micro Devices, Inc., Austin, TX (US)

( * ) Notice: Subject to any disclaimer, the term of this patent is extended or adjusted under 35 U.S.C. 154(b) by 232 days.

(21) Appl. No.: 18/217,079

(22) Filed: Jun. 30, 2023

(65) Prior Publication Data

US 2025/0004963 A1    Jan. 2, 2025

(51) Int. Cl.
*G06F 13/36* (2006.01)

(52) U.S. Cl.
CPC ...... *G06F 13/36* (2013.01); *G06F 2213/0056* (2013.01)

(58) Field of Classification Search
None
See application file for complete search history.

(56) References Cited

U.S. PATENT DOCUMENTS

| 4,314,349 | A  |   | 2/1982 | Batcher |            |
|-----------|----|---|--------|---------|------------|
| 5,960,211 | A  | * | 9/1999 | Schwartz | G06F 15/80 |
|           |    |   |        |         | 712/15     |
| 7,046,522 | B2 | * | 5/2006 | Sung    | H05K 1/115 |
|           |    |   |        |         | 174/262    |
| 9,736,187 | B2 | * | 8/2017 | Chen    | H04L 63/20 |

(Continued)

OTHER PUBLICATIONS

Sangaiah, Karthik, et al., "SnackNoC: Processing in the Communication Layer", 2020 IEEE Intl Symp on (HPCA), DOI: 10.1109/HPCA47549.2020.00045, 13 pages.

(Continued)

*Primary Examiner* — Elias Mamo
(74) *Attorney, Agent, or Firm* — Hickman Becker Bingham Ledesma LLP

(57) ABSTRACT

A semiconductor device, referred to herein as a Globally Interconnected Operations (GIO) layer, provides global operations in the form of global data reduction for one or more PE arrays. The GIO layer includes processing elements that perform global data reduction on processing results from one or more PE arrays. The GIO layer includes connectors that allow it to be arranged in a 3D stack with one or more PE arrays, for example, on top of or beneath a PE array. This allows reduction operations to be implemented across PE arrays using an efficient topology with superior flexibility, scalability, latency and/or power characteristics that is customizable for particular use cases at assembly time, without requiring costly and time-consuming redesign of PE arrays, and without being constrained by particular PE array designs.

21 Claims, 2 Drawing Sheets

(56) References Cited

U.S. PATENT DOCUMENTS 11,367,673 B2* 6/2022 Lim ................. H01L 21/486
2014/0122551 A1* 5/2014 Dogon ................ G06F 17/16
708/200

OTHER PUBLICATIONS

Jan, B.-Y., et al., "A fault-tolerant PE array based matrix multiplier design", IEEE 2012, DOI: 10.1109/VLSI-DAT.2012.6212624, Apr. 2012, 5 pages.

* cited by examiner

FIG. 1A
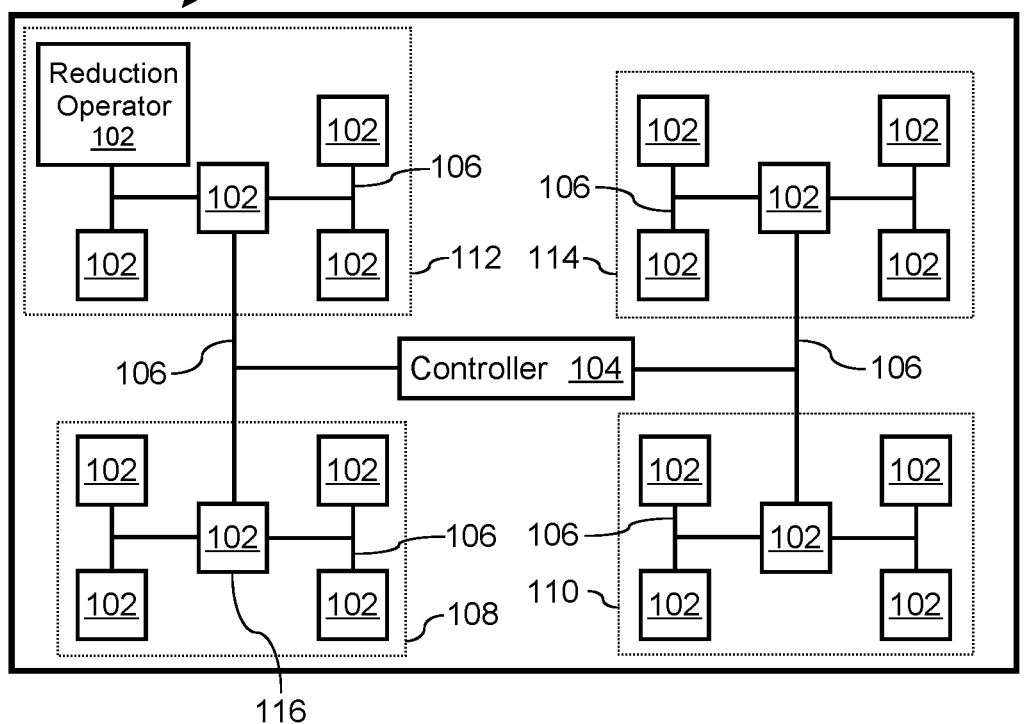
FIG. 1B
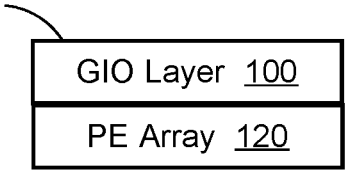
FIG. 1C

SEMICONDUCTOR DEVICE FOR PERFORMING DATA REDUCTION FOR PROCESSING ARRAYS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Processing Element (PE) arrays are semiconductor devices that include a large number of PEs, such as processing logic or cores, for performing large numbers of operations and/or calculations in parallel. For example, PE arrays can include hundreds or even thousands of PEs. PE arrays provide substantial computing resources that can operate in parallel with other IC functionality, which is particularly useful in various contexts such as machine learning, graph analytics, etc. PE arrays are typically implemented on a processor (Central Processing Unit (CPU) or Graphics Processing Unit (GPU)) die or on a separate die within an Integrated Circuit (IC) package and may include other elements, such as controllers, logic, etc. Alternatively, PE arrays may be implemented by a multi-core CPU or GPU processor where the cores are the PEs.

One of the technical challenges with PE arrays is that global signaling and/or logic operations (referred to hereinafter as "global operations") are commonly needed to process the processing results generated by PE arrays. Examples of global operations include data aggregation, compression, and reduction, Convolutional Neural Network (CNN) pooling, data broadcasting, global signaling, and synchronization/atomics. These global operations are often performed by processor side software that requires extensive data movement, which limits performance and incurs high overhead costs, such as high latency and high energy costs, which can adversely affect application performance, especially for large PE arrays. Also, PE array resources can be idle during global operations, which is inefficient.

One solution is to implement global operations in PE arrays themselves. For example, the design of PE arrays can be modified to include circuitry, firmware, and/or software to perform the global operations. This reduces the amount of data that needs to be moved by processor side software, which improves efficiency. This solution, however, increases the size of the PE arrays, complicates the logic layout and wire routing of the PE arrays, for example to accommodate the processing logic along with connections, such as a mesh or ring, and is constrained by the design of the PE arrays. This solution also binds the modified design to a particular implementation that may not be well suited for all applications.

In view of the foregoing, there is a need for an approach for implementing global operations with PE arrays that avoids the limitations and costs of other solutions.

BRIEF DESCRIPTION OF THE DRAWINGS

Implementations are depicted by way of example, and not by way of limitation, in the figures of the accompanying drawings and in which like reference numerals refer to similar elements.

FIG. 1A is a block diagram that depicts a top view of a GIO layer.

FIG. 1B depicts a side view of a 3D stacked arrangement in which a GIO layer is disposed on top of a PE array.

FIG. 1C depicts an enlarged partial side view of a GIO layer

DETAILED DESCRIPTION

Figure 1D:
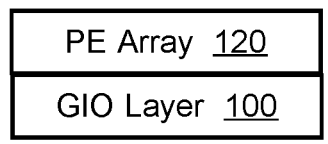
FIG. 1D depicts a side view of a 3D stacked arrangement in which a GIO layer is disposed underneath a PE array.

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Architecture
  A. Overview
  B. Reduction Operators
  C. The Controller
  D. The Interconnect
  E. Connectors
  F. Example Configurations

I. Overview

A semiconductor device, referred to herein as a Globally Interconnected Operations (GIO) layer, provides global operations in the form of global data reduction for one or more PE arrays. The GIO layer includes processing elements that perform global data reduction on processing results from one or more PE arrays. The GIO layer includes connectors that allow it to be arranged in a 3D stack with one or more PE arrays, for example, on top of or beneath a PE array. This allows reduction operations to be implemented across PE arrays using an efficient topology with superior flexibility, scalability, latency and/or power characteristics that is customizable for particular use cases at assembly time, without requiring costly and time-consuming redesign of PE arrays, and without being constrained by particular PE array designs. As used herein, the term "data reduction" refers to any arbitrary logic function. One non-limiting example of data reduction is aggregation, for example, to aggregate processing results generated by a PE array.

II. Architecture

A. Overview

FIG. 1A is a block diagram that depicts a top view of a GIO layer 100. In the example of FIG. 1A, the GIO layer 100 includes reduction operators 102 and a controller 104 communicatively coupled by an interconnect 106. The GIO layer 100 also includes one or more connectors (not depicted in FIG. 1A) that connect the GIO layer 100 to a corresponding PE array and more specifically, communicatively couples the interconnect 106 (and the reduction operators 102 and the controller 104) to the PEs on the corresponding PE array. The GIO layer 100 may include other elements depending upon a particular implementation. According to an implementation, the GIO layer 100 is a small block of semiconducting material, such as Silicone-based die, a Gallium Nitride-based die, a Gallium Arsenide-based die, or an organic-based die, although other shapes and materials may be used.

B. Reduction Operators

The reduction operators 102 are processing elements that perform data reduction on processing results from one or more PE arrays. For example, suppose that a PE array performs one or more operations on data and generates a plurality of processing results. The reduction operators 102 on the GIO layer 100 perform one or more data reduction operations on the plurality of processing results and generate a plurality of data reduction results, which may be intermediate data reduction results or final data reduction results.

The reduction operators 102 are implemented by any logic or computational entity that has the capability to generate data reduction results. Example implementations of the reduction operators 102 include, without limitation, logic gates, such as AND, OR, XOR, etc., lookup tables, Arithmetic Logic Units (ALUs), finite state machines, programmable processing units executing software or firmware, and dataflow functional units. According to an implementation, each reduction operator 102 includes local storage for storing its respective data reduction result(s), although local storage is not required. The local storage is any type of storage that may be implemented on a semiconductor device, such as one or more registers or caches. The reduction operators 102 on any given GIO layer may be implemented the same, e.g., by a common logic gate arrangement, or differently, depending upon a particular implementation. For example, on the GIO layer 100 some reduction operators 102 may be implemented by logic gates or an ALU, while other reduction operators on the same GIO layer 100 are implemented by a finite state machine.

The number of reduction operators 102 used for any particular GIO layer is not limited to a particular number and may vary depending upon the requirements of a particular design. According to one implementation, the number of reduction operators 102 is equal to the number of PEs in a corresponding PE array. For example, suppose that a particular PE array has N number of PEs. The GIO layer 100 that is designed to be used with the particular PE array has N number of reduction operators 102, where each reduction operator has a corresponding PE. This is not required, however, and other ratios of reduction operators 102 to PEs may be used. The location of reduction operators 102 on the GIO layer 100 may vary depending upon a particular implementation. For example, according to an implementation, a reduction operator 102 is located directly above a corresponding PE on PE array via direct connection, as described in more detail hereinafter. This provides a very short path length between each PE in a PE array and a corresponding reduction operator in a GIO layer, which reduces latency and improves performance.

The reduction operators 102 may automatically perform data reduction in response to the availability of processing results at a corresponding PE. For example, a reduction operator 102 performs its respective data reduction in response to sensing available processing results from one or more PEs, in response to control signals via the interconnect 106, or in response to one or more commands from the controller 104.

According to an implementation, the reduction operators on a GIO layer are logically organized in a hierarchy such that some reduction operators perform data reduction on processing results from a PE array, while other reduction operators perform one or more functions, such as further data reduction, on the data reduction results generated by the other reduction operators.

For example, in FIG. 1A, the reduction operators 102 are logically organized into four reduction operator groups 108, 110, 112, 114 that each include five reduction operators 102 and are organized in a two-level hierarchy. The number of reduction operators 102 per group may vary depending upon a particular implementation and the use of five reduction operators 102 per group in FIG. 1A is used for explanation purposes only.

Referring to the reduction operator group 108, the particular reduction operator 102 identified by reference numeral 116 processes the data reduction results generated by the other four reduction operators 102 in the reduction operator group 108. For example, the other four reduction operators 102 first perform data reduction on processing results from a PE array and generate data reduction results. The particular reduction operator 102/116 then performs one or more other functions on the processing results, such as aggregating the processing results, and generates additional data reduction results that are processed by the controller 104. In the example GIO layer 100 of FIG. 1A, this functionality is repeated for the other three reduction operator groups 110, 112, 114 to provide a total of four additional data reduction results to the controller 104. The specific functionality implemented by each level in the hierarchy may be different. For example, instead of each level in the hierarchy aggregating results from the reduction operators 102 in the level below, the higher level may perform additional and/or different functionality, such as a applying a function to the data reduction results generated by the reduction operators.

C. The Controller

The controller 104 performs a variety of functions that may vary depending upon a particular implementation. According to one implementation, the controller 104 causes the reduction operators 102 to perform their respective reduction operations on the processing results generated by a PE array, for example by signaling the reduction operators 102 via the interconnect 106 to perform their respective reduction operations. This may include the controller 104 sending one or more commands to the reduction operators 102, where the commands instruct the reduction operators 102 to perform their respective preconfigured reduction operations or where the commands specify particular reduction operations for the reduction operators 102 to perform. For example, the commands may specify one or more logical operations and/or computations for the reduction operators 102 to perform. According to an implementation, the controller 104 is configurable to signal a subset of the reduction operators 102 to perform their respective data reduction operations, for example in response to a special data reduction command issued by a core. This allows global reduction to be performed by a subset of reduction operators 102.

According to another implementation, the reduction operators 102 and/or the controller 104 are configured to detect whether a PE array is powered on and if so, automatically perform data reduction when processing results are provided by PEs in the PE array. For example, the reduction operators 102 and/or the controller 104 may be configured to detect electrical connectivity, e.g., the presence of a voltage on a particular connection, to detect that a PE array is powered on. According to yet another implementation, PEs in a PE array are configured to detect the presence of a GIO layer, e.g., via electrical connectivity, and if present, send their processing results to the corresponding reduction operators 102 on the GIO layer instead of other elements on the PE array, or to elements external to the PE array. As another example, a controller and/or logic on a PE array may be configured to detect the presence of a GIO layer and if present, cause the PEs on the PE array to send their processing results to the GIO layer for processing.

According to an implementation, the controller 104 processes the plurality of data reduction results generated by the reduction operators 102. This may include, for example, performing one or more operations or computations, such as logical operations, aggregation, etc., on the data reduction results to generate processed data reduction results, which may represent intermediate or final data reduction results. For example, according to an implementation, the controller 104 aggregates the data reduction results generated by the reduction operators 102 (or a specified subset of reduction operators 102), and generates processed data reduction results in the form of a final data reduction result. The controller 104 also causes the processed data reduction results to be transmitted to a core or other entity via the interconnect 106 and the corresponding PE array. In the prior example, the controller 104 causes the final data reduction result to be transmitted to a core or other entity. According to another implementation, the controller 104 causes the processed data reduction results to be rebroadcast to the PE array for additional processing. For example, the controller 104 may rebroadcast an accumulated result back to the PE array to be used to normalize the data being processed on the PEs according to an array-wide value. The processed data reduction results may be used by all of the PEs on the PE array or a subset of the PEs, depending upon a particular implementation. In addition, the processed data reduction results are not limited to the example of being used to normalize the data being processed on the PEs and may be used in other ways. The rebroadcasting of the processed data reduction results may be accomplished, for example, by elements of the interconnect.

The controller 104 is not required to perform operations or computations on the data reduction results generated by the reduction operators 102 and may instead cause the data reduction results generated by the reduction operators 102 (or a subset of data reduction operators 102) to be transmitted to another entity without further processing. For example, in FIG. 1A, the controller 104 causes the four data reduction results generated by the reduction operators 102 to be transmitted to another entity without further processing.

The controller 104 is implemented by any logic or computational entity that has the capability to process data reduction results generated by the reduction operators 102. Example implementations of the controller 104 include, without limitation, logic gates, such as AND, OR, XOR, etc., a programmed controller, a central processing unit, a graphical processing unit, a dataflow coordinator to control data movement between PEs across a PE array, etc. The controller 104 may also include lookup tables and/or configurable hardware, a system-level interface, routers and routing tables to forward data to specified PEs and/or global reduction operators.

The controller 104 may be configured with global reduction operator functionality similar to the reduction operators 102 to perform global data reduction on the data reduction results generated by the reduction operators 102. According to an implementation, the functionality of the controller 104 is configurable, for example, by one or more configuration commands. This includes the capability to specify the particular processing that the controller 104 performs on data reduction results generated by the reduction operators 102. This may also include specifying which data reduction results are processed. For example, the controller 104 may be configured to generate processed data reduction results from a specific subset of reduction operators.

Although implementations are depicted in the figures and described herein in the context of the GIO layer 100 including one controller 104 for purposes of explanation, the GIO layer 100 may include multiple controllers 104. In addition, the controller 104 may be implemented in any location on the GIO layer 100. According to an implementation, the location of the controller 104 is selected to provide the shortest aggregate path length to the reduction operators 102. For example, as depicted in FIG. 1A, the controller 104 is located generally in the center of the GIO layer 100 to provide the shortest aggregate path length to the reduction operators 102. According to another implementation, the location of the controller 104 on the GIO layer 100 is determined to satisfy other criteria, such as an expected energy cost of communications on the GIO layer 100 given expected traffic patterns of target workloads, the communication latency to and/or from the most performance-critical PEs, etc. For example, the location of the controller 104 is selected to provide a lowest energy cost of communications on the GIO layer 100.

D. The Interconnect

The interconnect 106 is implemented by any structure that communicatively couples the reduction operators 102 and the controller 104 to each other and to connectors that connect the GIO layer 100 to a corresponding PE array. This allows the reduction operators 102 to receive and process the processing results from one or more PE arrays and the controller 104 to process the data reduction results generated by the reduction operators 102. According to an implementation, the interconnect 106 is implemented by one or more metal layers on a top surface of the GIO layer 100, within the GIO layer 100, or both on top of and within the GIO layer 100. For example, the interconnect 106 may include one or more portions on top of the GIO layer 100 and one or more portions within the GIO layer 100. The interconnect 106 may be formed using any semiconductor processing method and implementations are not limited to any particular method for creating the interconnect 106 on the GIO layer 100. Example materials for the interconnect 106 include, without limitation, aluminum, copper, and gold.

The architecture and topology of the interconnect 106 may vary depending upon a particular implementation. Example topologies include, without limitation, a uniform tree, a fat tree, and a hierarchical mesh, with arbitrary application specific radix and data width. The interconnect 106 may be unidirectional or bidirectional and may be reconfigurable based upon the requirements of a particular application. According to an implementation, the interconnect 106 includes network functionality. Alternatively, alternative technologies may be used, such as asynchronous signal interfacing in the interconnect 106 that is manufactured in a different technology than a synchronous interconnect controlling the corresponding PE array. PE arrays connect to the interconnect 106 via one or more connectors described in more detail hereinafter. The interconnect 106 may provide a single conductive path or multiple conductive paths, for example, separate conductive paths for power, signals and data.

E. Connectors

According to an implementation, the GIO layer 100 includes one or more connectors that communicatively couple the interconnect 106 to one or more PE arrays. When the GIO layer 100 and a PE array are arranged in a 3D stacked arrangement, the combination of the connectors and interconnect 106 allow the reduction operators 102 and the controller 104 to access the processing results generated by the PE array. Example connectors include, without limitation, vias such as Through Silicon Vias (TSVs), microbumps, hybrid bonding, solder balls, solder pads, pins, wire bonds, etc.

The connectors may provide both an electrical (communicative) and mechanical connection of the GIO layer 100 to a PE array. For example, in a "flip chip" implementation, solder balls on the GIO layer 100 provide both an electrical connection and a mechanical connection between the GIO layer 100 and the PE array. In this arrangement, an electrically non-conductive adhesive is underfilled in voids between the GIO layer 100 and the PE array to provide a stronger mechanical connection between the GIO layer 100 and the PE array. Alternatively, separate mechanical connectors may be used to mechanically connect the GIO layer 100 to the PE array. Examples of mechanical connectors include, without limitation, pins, ridges and protrusions, with corresponding holes, troughs, and recesses. For example, the GIO layer 100 may include a number of pins that are sized and located on the GIO layer 100 to cooperate with a corresponding number of holes on a PE array. According to an implementation, a connector, such as a TSV, is provided between each reduction operator in a GIO layer and a corresponding PE in a PE array. This provides a short direct connection between reduction operators on a GIO layer and PEs in a PE array, which reduces latency and improves performance. Alternatively, a connector is provided between each PE in a PE array and the interconnect 106 on the GIO layer 100, for example, at a location on the interconnect 106 adjacent a reduction operator 102.

F. Example Configurations

GIO layers may be used with PE arrays in a wide variety of configurations, also referred to herein as "arrangements," that vary depending upon a particular implementation. FIG. 1B depicts a side view of a 3D stacked arrangement in which the GIO layer 100 is disposed on top of a PE array 120. In this arrangement, the components of the GIO layer 100, i.e., the reduction operators 102, the controller 104, and the interconnect 106 are disposed on a top surface 100*a* (also referred to herein as a "first surface") of the GIO layer 100 and connectors, such as TSVs through the GIO layer 100, electrically connect these components to components on the PE array 120, such as the PEs on the PE array 120.

FIG. 1C depicts an enlarged partial side view of the GIO layer 100. As depicted in FIG. 1C, the reduction operators 102, the controller 104, and the interconnect 106 are disposed on the top surface 100*a* of the GIO layer 100 and connectors 116, such as TSVs, are formed in the GIO layer 100 to provide electrical connections to a bottom surface 100*b* (also referred to herein as a "second surface") of the GIO layer 100 and to components on the PE array 120. The GIO layer 100 and the PE array 120 may include additional metal features, e.g., pads, columns, pillars, etc., to provide electrical connections between the components on the GIO layer 100 and the components on the PE array 120. In the example implementation of FIG. 1C, each reduction operator 102 has a corresponding connector 116 to a corresponding PE on the PE array 120, although this is not required. FIG. 1C also depicts an optional connector 116 between the interconnect 106 and the bottom surface 100*b* of the GIO layer 100 which, for example, provides electrical connectivity between the interconnect 106 and an element on the PE array 120, such as a corresponding interconnect or a communications channel on the PE array 120.

According to another implementation, the GIO layer 100 is arranged with the PE array 120 in a "flip chip" arrangement where the GIO layer 100 includes solder balls or the like on the top surface 100*a* and is attached to the PE array 120 in an inverted orientation. The components of the PE array 120, such as PEs, interconnects, controllers, logic, processors, and the like, may be disposed on either the top or bottom surface of the PE array 120, depending upon a particular implementation. Implementations are applicable to any type of PE array. For example, some PE arrays include a large number of PEs implemented by simple processing logic and the PEs are controlled by one or more controllers and/or logic on the PE array. Other PE arrays use more sophisticated PEs in the form of processors and these PE arrays may not have onboard controllers and/or logic to control the PEs.

The GIO layer 100 and the PE array 120 are depicted in the figures as having very similar dimensions, thickness, width, etc., for purposes of explanation only and implementations are applicable to GIO layers and PE arrays with different dimensions. For example, a GIO layer may be larger or smaller, and/or thicker or thinner than a corresponding PE array. According to an implementation, the GIO layer 100 and the PE array 120 have at least one surface with similar dimensions to allow the GIO layer 100 and the PE array 120 to be arranged in a 3D stack. For example, in FIG. 1B, the bottom surface of the GIO layer 100 and the top surface of the PE array 120 are similar in area and shape to allow the GIO layer 100 and the PE array 120 to be arranged together in a 3D stack. This also allows connectors on the GIO layer 100 and the PE array 120 to cooperate to provide a mechanical connection between the GIO layer 100 and the PE array 120. In the implementations depicted in the figures, a non-conductive filler material may be used in voids between the GIO layer 100 and the PE array 120 to provide a mechanical connection between the GIO layer 100 and the PE array 120.

Figure 1E:
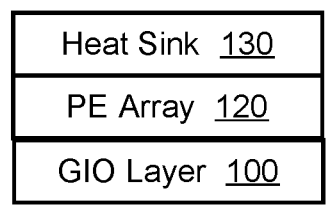
FIG. 1E depicts a side view of a 3D stacked arrangement in which a PE array is disposed on top of a GIO layer, and a heat sink is disposed on the top of the PE array.

FIG. 1D depicts a side view of a 3D stacked arrangement in which the GIO layer 100 is disposed underneath the PE array 120. This arrangement provides thermal benefits when the PE array 120 is more electrically active, i.e., consuming more power and/or generating more heat, than the GIO layer 100, by allowing better heat dissipation from the PE array 120. This allows thermally constrained implementations to use minimal active logic in the GIO layer 100 and other implementations to leverage the stacked area of the GIO layer 100 to implement more advanced capabilities without affecting the design of the PE array 120. In addition, this arrangement allows a heat sink to be used with the PE array 120. FIG. 1E depicts a side view of a 3D stacked arrangement in which the PE array 120 disposed on top of the GIO layer 100 and a heat sink is disposed on the top of the PE array 120. This arrangement can provide improved heat dissipation when the PE array 120 is more active than GIO layer 100 and generates a larger amount of heat.

Figure 1F:
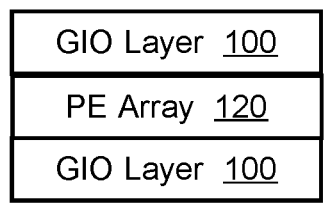
FIG. 1F depicts a side view of a 3D stacked arrangement that uses two GIO layers with a PE array.
Figure 1G:
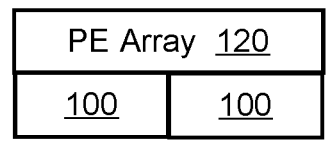
FIG. 1G depicts a side view of a 3D stacked arrangement that uses two GIO layers underneath the PE array.

Implementations are applicable to using multiple GIO layers 100 to provide global reduction. Using multiple GIO layers 100 allows the global reduction work to be divided among multiple GIO layers 100, which may provide performance benefits in some situations. Multiple GIO layers 100 may be used in a wide variety of configurations that vary depending upon a particular implementation. FIG. 1F depicts a side view of a 3D stacked arrangement that uses two GIO layers 100 with the PE array 120. In this arrangement separate GIO layers 100 are disposed on top of and underneath the PE array 120. FIG. 1G depicts a side view of a 3D stacked arrangement that uses two GIO layers 100 underneath the PE array 120. Implementations are not limited to using two GIO layers 100 with the PE array 120 and a greater number of GIO layers 100 may be used. For example, three, four or more GIO layers 100 may be used with a PE array.

For implementations where multiple GIO layers 100 are used, a core may coordinate load sharing among the multiple GIO layers 100 and signal and/or issue global reduction commands to the controllers 104 on each GIO layer 100. Alternatively, a core may issue a global reduction signal or command and the controllers 104 on the GIO layers 100 coordinate the global data reduction amongst themselves.

The 3D stacked arrangements of FIGS. 1B and 1D-1G provide the technical benefits of short path lengths and reduced latency between the GIO layer and the PE array, which improves performance. The 3D stacked arrangements also provide a flexible, compact, and scalable topology that can be customized for particular design requirements, with minimal redesign requirements for the PE arrays. The 3D stacked arrangements also allow GIO layers to be manufactured separately from PE arrays and using different manufacturing materials and processes, for example with different line widths, to further improve flexibility, reduce costs and improve manufacturing timelines. The GIO layers are then assembled with corresponding PE arrays according to a particular design. According to an implementation, PE arrays are manufactured in a manner so that they can be used with or without a corresponding GIO layer. For example, a PE array is manufactured with connectors, such as metal pads, etc., that are configured, i.e., located, sized, etc., to contact corresponding connectors, such as TSVs, balls, etc., on a GIO layer after assembly. This allows a standardized PE array design to be used without a GIO layer, i.e., in a standalone configuration, or with a GIO layer in a 3D stacked arrangement.

The invention claimed is:

1. A semiconductor device comprising:
one or more connectors for connecting the semiconductor device to a processing element array in a stacked arrangement, wherein the processing element array includes a plurality of processing elements that are configured to generate a plurality of processing results,
a plurality of reduction operators configured to perform one or more data reduction operations on the plurality of processing results generated by the plurality of processing elements on the processing element array and generate a plurality of data reduction results, and
an interconnect coupled to the plurality of reduction operators and the one or more connectors.

2. The semiconductor device of claim 1, wherein the one or more connectors include one or more of: one or more vias, one or more solder balls, one or more microbumps, one or more solder pads, one or more pins, one or more wire bonds, or one or more hybrid bonded connections.

3. The semiconductor device of claim 1, wherein the one or more connectors electrically connect the plurality of reduction operators to the plurality of processing elements on the processing element array.

4. The semiconductor device of claim 3, wherein the one or more connectors include, for each reduction operator from the plurality of reduction operators, one or more connectors to connect the reduction operator to a corresponding processing element from the plurality of processing elements of the processing element array.

5. The semiconductor device of claim 1, wherein the one or more connectors provide a mechanical connection of the semiconductor device to the processing element array in a 3D stacked arrangement.

6. The semiconductor device of claim 1, wherein the plurality of reduction operators is one or more of: one or more logic gates, one or more lookup tables, one or more arithmetic logic units, one or more finite state machines, one or more programmable processing units, or one or more dataflow functional units.

7. The semiconductor device of claim 1, wherein the plurality of reduction operators is configured to perform the one or more data reduction operations on the plurality of processing results generated by the plurality of processing elements on the processing element array in response to one or more of: one or more signals from a controller on the semiconductor device or a detected availability of the plurality of processing results from the plurality of processing elements.

8. The semiconductor device of claim 1, wherein the plurality of reduction operators includes a particular reduction operator that is configured to process the data reduction results generated by one or more other reduction operators from the plurality of reduction operators.

9. The semiconductor device of claim 1, wherein the interconnect comprises one or more metal layers that are one or more of: disposed on a surface of the semiconductor device or disposed within the semiconductor device.

10. The semiconductor device of claim 9, wherein the interconnect has a tree topology.

11. The semiconductor device of claim 9, wherein the interconnect is comprised of aluminum, copper, or gold.

12. The semiconductor device of claim 1, further comprising a controller configured to perform one or more of: orchestrate the one or more data reduction operations or process the plurality of data reduction results generated by the plurality of reduction operators.

13. The semiconductor device of claim 12, wherein processing the plurality of data reduction results generated by the plurality of reduction operators includes one or more of: performing one or more logical operations on the plurality of data reduction results, performing one or more computations on the plurality of data reduction results, aggregating the data reduction results to generate aggregated data reduction results, causing the data reduction results to be transmitted to a host processor via the interconnect, or causing the data reduction results to be transmitted to the processing element array.

14. The semiconductor device of claim 12, wherein the controller is further configured to signal or command the plurality of reduction operators to perform the one or more data reduction operations on the plurality of processing results from the processing element array.

15. The semiconductor device of claim 12, wherein the controller is disposed on the semiconductor device at a location that one or more of: provides a shortest aggregate path length to the plurality of reduction operators, or optimizes an expected energy cost of communications on the semiconductor device.

16. The semiconductor device of claim 12, wherein the controller, the plurality of reduction operators, and the interconnect are one or more of: disposed on a surface of the semiconductor device or disposed within the semiconductor device.

17. The semiconductor device of claim 12, wherein the controller is implemented by one or more of: one or more logic gates, one or more programmed controllers, one or more central processing units, one or more graphical processing units, or one or more dataflow coordinators.

18. The semiconductor device of claim 1, wherein the semiconductor device is a Silicon-based die, a Gallium Nitride-based die, a Gallium Arsenide-based die, or an organic-based die.

19. The semiconductor device of claim 1, wherein the semiconductor device has a first surface that is adjacent a first surface of the processing element array in the stacked arrangement, and wherein the first surface of the semiconductor device has approximately the same area as the first surface of the processing element array.

20. The semiconductor device of claim 1, wherein the semiconductor device is manufactured separately from and using a different process than the processing element array.

21. A semiconductor device comprising:

a first layer comprising:

one or more first connectors for connecting the first layer to a processing element array in a stacked arrangement, wherein the processing element array includes a plurality of processing elements that are configured to generate a plurality of processing results, a first plurality of reduction operators configured to perform one or more first data reduction operations on at least a portion of the plurality of processing results generated by the plurality of processing elements on the processing element array and generate a first plurality of data reduction results, and a first interconnect coupled to the first plurality of reduction operators and the one or more first connectors; and a second layer comprising:

one or more second connectors for connecting the second layer to the processing element array in the stacked arrangement, a second plurality of reduction operators configured to perform one or more second data reduction operations on at least a portion of the plurality of processing results generated by the plurality of processing elements on the processing element array and generate a second plurality of data reduction results, and a second interconnect coupled to the second plurality of reduction operators and the one or more second connectors.

* * * * *